United States Patent [19]

Cutler

[11] 4,118,464
[45] Oct. 3, 1978

[54] PROCESS FOR SEPARATING SILICA FROM SILICATE-BEARING MATERIALS

[75] Inventor: Ivan B. Cutler, Centerville, Utah

[73] Assignee: University of Utah, Salt Lake City, Utah

[21] Appl. No.: 766,157

[22] Filed: Feb. 7, 1977

[51] Int. Cl.$^2$ ............................................. C01B 31/36
[52] U.S. Cl. .................................... 423/346; 423/75; 423/133; 423/137
[58] Field of Search .................. 423/346, 75, 133, 137

[56] References Cited

U.S. PATENT DOCUMENTS

| 2,823,979 | 2/1958 | Sears | 106/288 B |
|---|---|---|---|
| 3,246,950 | 4/1966 | Gruber | 423/346 |
| 3,306,705 | 2/1967 | Leineweber et al. | 423/346 |
| 3,371,995 | 3/1968 | Pultz | 423/346 |
| 3,495,939 | 2/1970 | Forrest | 423/346 |

FOREIGN PATENT DOCUMENTS

| 1,180,918 | 2/1970 | United Kingdom | 423/346 |
|---|---|---|---|
| 1,232,617 | 5/1971 | United Kingdom | 423/346 |

*Primary Examiner*—O. R. Vertiz
*Assistant Examiner*—Wayne A. Langel

[57] ABSTRACT

A process for removing silicon from a silicate-bearing material. The silicate-bearing material is analyzed for its silicon content and mixed with a controlled quantity of carbon as indicated by the analysis. The carbon is limited to an amount less than the stoichiometric amount necessary to react with the silicon to form silicon carbide. The silicate-bearing material/carbon mixture is formed into a first phase and interposed with a second phase containing additional carbon to form a reaction mixture. The reaction mixture is subjected to a carbothermal reduction reaction to reduce silica in the silicate-bearing material to silicon monoxide. At the temperatures involved in the reaction, the silicon monoxide is in the gaseous phase and readily diffuses from the first phase into the second phase where the diffused silicon monoxide reacts with the additional carbon in the second phase to form silicon carbide. The silicon carbide formation reaction occurs in the gaseous phase so that the silicon carbide is deposited in the second phase in the form of fine fibers. The silicon carbide fibers may be separated from the reaction mixture residue by conventional mechanical separation techniques. The first phase residue has a reduced silica content and may also be mechanically separated from the second phase.

11 Claims, 2 Drawing Figures

PROCESS FOR SEPARATING SILICA FROM SILICATE-BEARING MATERIALS

BACKGROUND

1. Field of the Invention

This invention relates to a process for separating silicon from silicate-bearing material and, more particularly, to a process involving the carbothermal reduction of silica in a silicate-bearing material to silicon monoxide. The process includes diffusion of the silicon monoxide from the silicate-bearing material where it is reacted with additional carbon to form silicon carbide fibers.

2. The Prior Art

Silicon is one of the most abundant elements in the earth's crust where it is usually combined with oxygen in the form of silica ($SiO_2$) or as a silicate in a silicate-bearing material. Various silicate-bearing materials are available in suitable quantities for possible exploitation as a raw material source for various products. However, in many instances their usefulness is severely limited by the excessive quantity of silica present. For example, vast deposits of clay ($Al_2O_3.2SiO_2$) represent a significant reservoir of alumina ($Al_2O_3$), a raw material for the aluminum industry, or even mullite, a useful refractory. Mullite is normally supplied from the mineral kyanite, or artificially by mixing aluminum oxide with clay so as to produce a higher alumina/silica ratio and thereby obtain mullite. Unfortunately, clay, by nature, contains a substantial quantity of silica which interferes with its usefulness as the desired raw material sources for either alumina or mullite.

Mullite ($3Al_2O_3.2SiO_2$) is one of the few compounds of aluminum and silicon that is stable at high temperatures. Mullite is, therefore, a useful refractory and does not deform under loads at 1800° C. Mullite is also resistant to corrosion and has a low coefficient of thermal expansion. Unfortunately, mullite is found in nature in only limited deposits while clay is abundantly available but has an excessive silica content which prevents clay from being used as a refractory in place of mullite.

Another silicate-bearing material which could advantageously benefit from the removal of silica is zircon ($ZrSiO_4$). Removal of the silica would leave zirconia ($ZrO_2$) which finds many uses as (1) a durable refractory, (2) an effective opacifier of fused enamels, glass, and glazes; (3) the manufacture of Welsbach mantles, and (4) numerous other uses, including the production of zirconium (Zr) which is useful in steel making.

Silicon carbide is another useful product which, historically, has been produced in an electric arc furnace from a reactant mixture including sand (silica, $SiO_2$) and coke (carbon, C). The reaction occurs at a high temperature and in the vapor phase with a resulting deposition of a non-fibrous, crystalline mass of silicon carbide on the surfaces surrounding the reaction zone. The crystalline mass of silicon carbide is removed from the furnace and treated by further crushing, grinding, and sizing prior to its being used in the abrasives and refractory industries.

However, of recent discovery, it has been found that silicon carbide can be formed also as fibers having a length to diameter ratio greater than about 50:1. The silicon carbide fibers, if produced in sufficient quantity, could serve as a useful reinforcement material for numerous applications in the metalurgical, cermet, ceramic and plastics industries.

In view of the foregoing, it would be a significant advancement in the art to provide a process for removing silicon and, more particularly, silica from silicate-bearing materials. An even further advancement in the art would be to provide a process whereby a controlled quantity of silica could be removed from a silicate-bearing material. Another advancement in the art would be to provide a process for reacting silicon monoxide obtained from a silicate-bearing material with carbon to form silicon carbide fibers. Such a process is disclosed in the present invention.

BRIEF SUMMARY AND OBJECTS OF THE INVENTION

The present invention relates to a process for the carbothermal reduction of silica in a silicate-bearing material. A carefully controlled quantity of carbon is mixed with the silicate-bearing material and serves to reduce the silica by a carbothermal reduction reaction to form silicon monoxide. The silicon monoxide is diffused from the silicate-bearing material and is reacted with additional carbon in the surrounding matrix to produce fibers of silicon carbide. Thereafter, the silicon carbide fibers are separated by conventional, mechanical separation techniques to produce fibers of silicon carbide and a residue material having a lower silica content.

It is, therefore, a primary object of this invention to provide improvements in the process for removing silica from a silicate-bearing material.

Another object of this invention is to provide a process for the carbothermal reduction of silica in a silicate-bearing material to silicon monoxide.

Another object of this invention is to provide a process for diffusing the silicon monoxide from the silicate-bearing material and reacting the diffused silicon monoxide with carbon to produce silicon carbide.

Another object of this invention is to provide a process for producing alumina from clay by removing silica from the clay.

Another object of this invention is to provide a process for producing mullite from clay by removing some of the silica from the clay.

Another object of this invention is to provide a process for producing zirconia from zircon by removing silica from the zircon.

One other object of this invention is to provide a process for forming fibers of silicon carbide.

Another object of this invention is to provide a process for mechanically separating silicon carbide fibers from the remaining residue.

These and other objects and features of the present invention will become more fully apparent from the following description and appended claims taken in conjunction with the accompanying drawing.

DETAILED DESCRIPTION OF THE PREFERRED EMBODIMENTS

General Discussion

Figure 1:
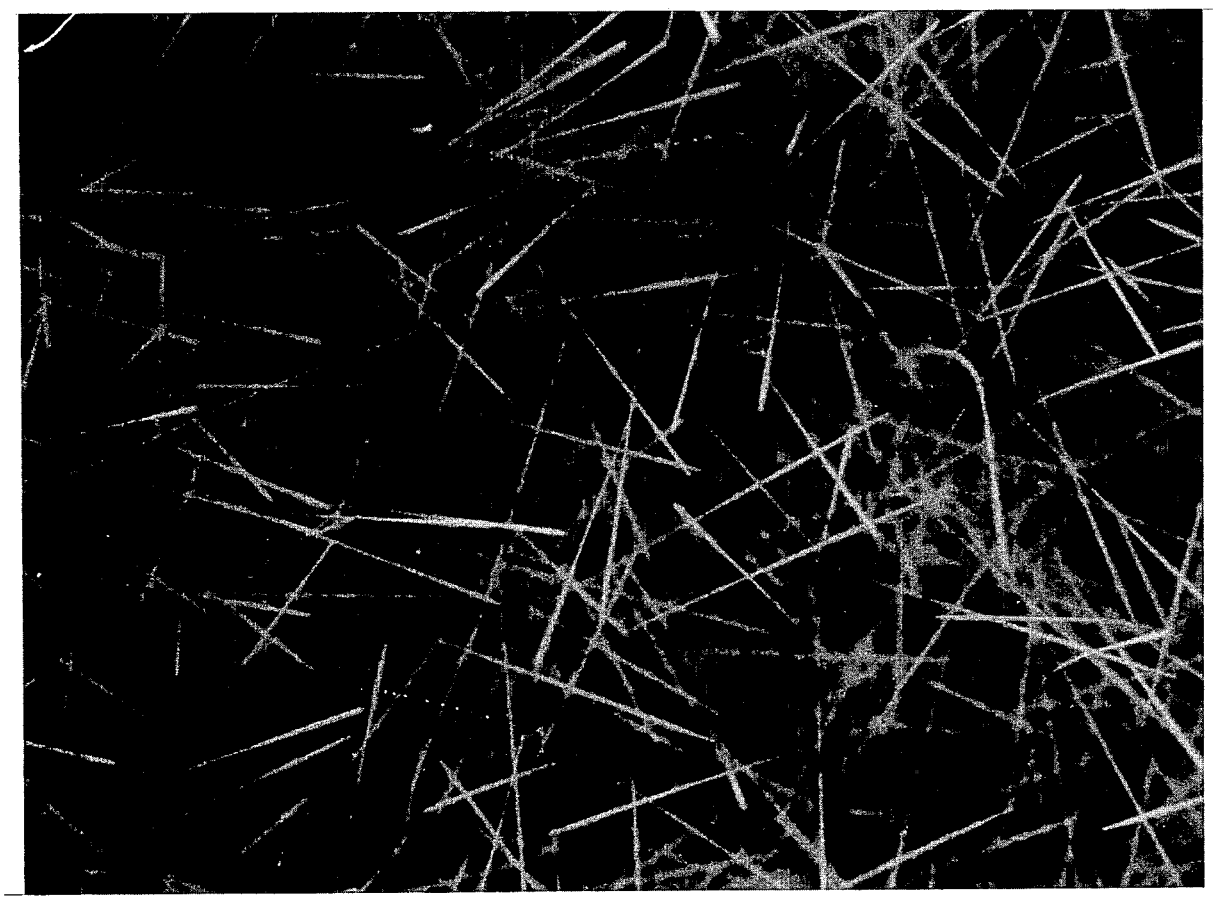
FIG. 1 is a photomicrograph of a mat of silicon carbide fibers.

The present invention is the result of an examination of the processes and actual mechanisms of the reaction between silica and carbon. A careful study of the kinetics of the reaction has shown that a volatile specie, silicon monoxide, is involved in the reaction. Additional experimentation developed the parameters for the production of the silicon monoxide and, subsequently, silicon carbide. The overall chemical reaction between silica and carbon may be written as follows:

$$SiO_2 + 3C \rightarrow SiC + 2CO \qquad (1)$$

It will be noted from this reaction that silicon carbide is generally considered to be one of the final reaction products. However, silicon monoxide is generally considered to be an intermediary interreaction product obtained by the carbothermal reduction of the silica. A limited carbon content (less than the stoichiometric amount to produce silicon carbide) in the system reduces the silica to silicon monoxide as set forth in the following reaction:

$$SiO_2 + C \rightarrow SiO + CO \qquad (2)$$

Accordingly, with a limited quantity of carbon intimately mixed with a silicate-bearing material, the silica therein is reduced to silicon monoxide (Reaction 2) without the reaction going to completion to form silicon carbide (Reaction 1). Clearly, some silicon carbide will be formed in the mixture of silicate-bearing material and carbon. However, silicon carbide reacts with silica to reduce the silica to silicon monoxide as set forth in the following reaction:

$$2SiO_2 + SiC \rightarrow 3SiO + CO \qquad (3)$$

Accordingly, as long as there is silica present in the phase, any silicon carbide formed therein will react with the silica as set forth in Reaction 3, above, to produce silicon monoxide and carbon monoxide. Depletion of the silica from the phase will result in any residual silicon carbide remaining in that state in the phase.

Importantly, the silicon monoxide is in a gaseous state which allows it to be physically transported away from the silicate-bearing material. Pelletizing or otherwise forming the silicate-bearing material into a discrete phase permits the volatile silicon monoxide to be physically transported out of the phase. Surrounding the pellets with a matrix or another phase of additional carbon results in the capture of the silicon monoxide by the other phase carbon and its reaction therewith to form silicon carbide. The additional carbon in the matrix, therefore, acts as a getter for the silicon monoxide in the system. This reaction is shown as follows:

$$SiO + 2C \rightarrow SiC + CO \qquad (4)$$

Accordingly, a primary feature of this invention consists of mixing only a part of the stoichiometric amount of the carbon necessary to form silicon carbide with the silicate-bearing material and forming the mixture into a first phase. Additional carbon is supplied to the overall reaction by surrounding the first phase with a second phase matrix of additional carbon. This combination of a first phase of silicate-bearing material with a limited carbon content and a second phase of additional carbon forms a reaction mixture. The reaction mixture is heated to temperatures above about 1200° C and under a nonreactive atmosphere.

The initial reaction is a carbothermal reduction reaction (Reaction 2 or, as set forth hereinbefore, Reaction 3) wherein the silica in the first phase is reduced to silicon monoxide. Importantly, only a limited quantity of carbon is mixed with the silicate-bearing material to thereby specifically reduce the silica to silicon monoxide without forming an excessive residual quantity of silicon carbide. The silicon monoxide thereafter volatilizes out of the first phase and reacts with the carbon in the carbon matrix of the second phase (Reaction 4).

Figure 2:
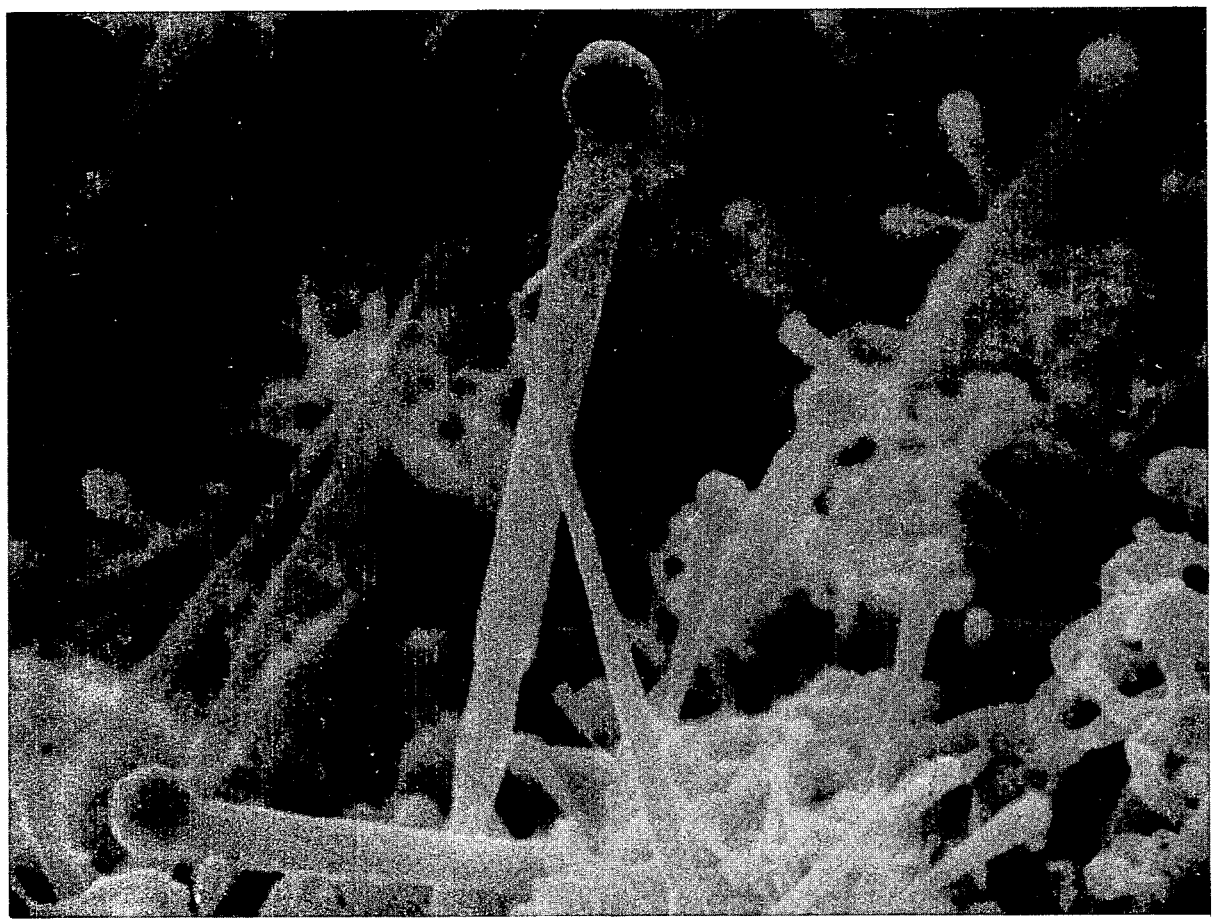
FIG. 2 is a photomicrograph of an enlargement of a silicon carbide fiber formed on a phase substrate.

Surprisingly, the silicon monoxide entering the second phase reacts with the carbon therein to form fibers of silicon carbide as shown in FIGS. 1 and 2. The precise mechanism for the formation of the silicon carbide fibers shown in FIGS. 1 and 2 is not clearly understood. It is known that a person following the steps of this invention can produce silicon carbide fibers having a relatively high length-to-diameter ratio as shown in FIGS. 1 and 2, the diameter of the fibers shown being about one micrometer.

Separation of the silicon carbide fibers is readily obtained by a suitable conventional mechanical screening process at which time there may be obtained an excellent separation of the silicon carbide from the second phase, carbon matrix residue and first phase residue.

Throughout the description of this invention language is employed which indicates that the silicate-bearing material and carbon are formed into a first phase while a carbon matrix is formed into a second phase and the first phase is dispersed throughout the second phase. Clearly, the two phases could be readily reversed with the carbon being formed as a first phase and dispersed throughout the second phase. In either instance, those practicing this invention may consider the advantages gained from preparing distinct phases having different strengths to accommodate subsequent separation of the phases by conventional mechanical screening techniques. Accordingly, for example, regardless of the particular silicate-bearing material utilized as the starting raw material, sufficient strength should be incorporated into the particular phase, for example, a first phase of silicate-bearing material/carbon pellets so that the silicon carbide will be capable of being screened away from the pellet and second phase residue.

The Production of Alumina from Clay

The process of this invention is surprisingly useful in removing silica from an aluminum silicate clay to leave a residue consisting essentially of alumina. The reaction involved may be written as follows:

$$Al_2O_3 \cdot 2SiO_2 + 2C \rightarrow Al_2O_3 + 2SiO + 2CO \qquad (5)$$

The foregoing formula for clay is that of a conventional kaolinite clay wherein the water has been driven off, for example, by the initial heating of the reactants.

The foregoing reaction is a carbothermal reduction reaction and is conducted with a carbon content less than the stoichiometric amount of carbon necessary to produce silicon carbide. Possibly, a limited amount of silicon carbide may be formed by the reaction as a result of some of the silicon monoxide being unable to diffuse out of the reaction mixture rapidly enough and further reacting with the carbon present therein. This is believed not to be detrimental since silicon carbide reduces silica (Reaction 3) and any residual silicon carbide can be suitably volatilized by chlorine according to conventional techniques.

Importantly, the amount of carbon present in the first phase mixture of silicate-bearing material and carbon is less than the stoichiometric amount of carbon necessary to react with all of the silicon present to form silicon carbide. Tests were conducted with a carbon content in the first phase as high as 16 percent by weight. However, at these higher percentages, greater amounts of residual silicon carbide were formed in the first phase. Accordingly, it was generally determined that about 10 percent or less, by weight, was the preferable maximum amount of carbon to mix with an aluminum silicate clay to remove the silicon therefrom as silicon monoxide. At carbon ratios less than about 7 percent carbon, by weight, the silica tended to be insufficiently reduced to silicon monoxide and thereby resulted in the formation of mullite. Some representative experimental results are set forth hereinbelow in Table I.

TABLE I

CARBOTHERMAL REDUCTION OF SILICA IN CLAY AT 1480° C (NONREACTIVE ATMOSPHERE)

| Sample No. | Clay/Carbon Ratio (%) | Reaction Time (hrs.) | Reaction Completion |
|---|---|---|---|
| 1 | 94/6 | 5 | 82% |
| 2 | 92/8 | 5 | 89% |
| 3 | 90/10 | 5 | 96% |
| 4 | 88/12 | 5 | Complete |
| 5 | 86/14 | 3 | 85% |
| 6 | 84/16 | 4 | Complete |
| 7 | 90/10 | 3.25 | 99% |
| 8 | 90/10 | 3.75 | Complete |
| 9 | 90/10 | 2.25 | 99% |

Samples 1–6 were prepared as a loose powder mixture of clay and carbon as the first phase which was packed between layers of carbon as the second phase. Samples 7–9 were prepared with a clay/carbon first phase as pellets having a −10 to +20 mesh size which were embedded in a second phase of carbon. Iron in the amount of 5 percent, by weight, was added to the carbon in the second phase of Sample 9.

The product composition varied between mullite in Sample 1 to alumina with small amounts of beta silicon carbide and mullite in Sample 4. Sample 6 produced alumina and beta silicon carbide.

Conventional stoichiometric reaction calculations based upon Reaction 2, above, will reveal the theoretical product compositions. In most instances certain limited quantities of silicon carbide were obtained in the residue of the first phase and were believed to be caused by the silicon monoxide being unable to diffuse into the second phase. The silicon monoxide reacted further with the carbon in the first phase to produce the silicon carbide (Reaction 4).

The iron present in the second phase in Sample 9 appeared to accelerate the formation of silicon carbide in the second phase. In this manner, the iron served as a catalyst and provided improved reaction rate for removing the silicon monoxide from the first phase enabling Reaction 2, above, to proceed more rapidly to the right.

With particular reference to FIG. 2, a silicon carbide fiber is shown with a rounded knob on its end. This knob was found to be an iron-rich mass. However, it is currently not clearly understood the role this iron-rich mass plays in the formation of the silicon carbide fiber. It has been determined that silicon carbide fibers produced in the presence of iron tend to have a shorter length-to-diameter ratio in the neighborhood of about 15 to 1 whereas those silicon carbide fibers produced in the absence of iron tend to be longer, that is, have a length-to-diameter ratio of about 50 to 1.

The Production of Mullite from Clay

The process of the present invention is also useful for the production of mullite from clay inasmuch as the resulting mullite has a reduced silicate content from that of a clay starting material. The process for making mullite from clay is substantially the same as the process for obtaining alumina from clay except that a smaller percentage of carbon, as shown in Table I, above, is mixed with the clay thereby reducing and removing only a part of the silica. The overall reaction is demonstrated in the following equation:

$$3(Al_2O_3 \cdot 2SiO_2) + 4C \rightarrow 3Al_2O_3 \cdot 2SiO_2 + 4SiO + 4CO \qquad (6)$$

As set forth previously, the silica is reduced to silicon monoxide and volatilized from the first phase where it reacts with additional carbon in a surrounding matrix to form silicon carbide fibers.

Although there is a slightly lower carbon content in the clay pellet for producing mullite, there are good reasons for using a slight excess of carbon in the pellet while producing either alumina or mullite. For the case of alumina, it would be more valuable to have a residual silicon carbide content in the alumina first phase derived from the clay/carbon mixture rather than to have any remaining silicate present as a free silica such as cristobalite. The cristobalite would be extremely difficult to remove whereas a small amount of silicon retained as silicon carbide in the alumina first phase could be easily volatilized by reaction with chlorine. Reaction with chlorine would also provide the significant advantage for eliminating any titania or iron impurities in the clay as well.

In the case of mullite production, an advantage is obtained by having a slight excess carbon in the pellet so that the mullite contains a little alpha alumina rather than a little residual silica which would form a glass when the mullite is sintered. Under the conditions of forming mullite with a slight amount of alumina, it is possible to produce a fine-grained, sintered mullite of high strength.

Although clays tend to be the primary silicate-bearing raw material under consideration for the process of this invention, other silicate-bearing materials may also be advantageously processed by this invention. For example, bauxitic ores that contain an aluminum hydroxide or aluminum oxyhydroxide along with clay which, of course, contains silica which can be removed by the process of the present invention.

Advantageously, numerous clay deposits located adjacent coal seams and the like as a natural result of the geologic formation of the coal seams. These clay deposits contain a natural carbon source as a result of being in close proximity to the coal seams. The carbon content ranges from very low percentages to high enough percentages that the clay becomes a minor contaminant of the coal rather than the reverse. In this circumstance, the coal in the clay serves as a source of carbon for the desired reaction herein and it only becomes necessary to analyze the coal-bearing clay and suitably adjust either the carbon or clay content to bring the silica/carbon ratios within the desired ranges to produce either the alumina or mullite.

The Production of Zirconia from Zircon

Other silicate-bearing materials which could advantageously benefit from the process of this invention include zircon ($ZrSiO_4$) which could be used to produce zirconia ($ZrO_2$). In each case the silica content would, of necessity, need to be analyzed and the appropriate amounts of carbon mixed with the ore to form a first phase and in order to suitably volatilize the silica to produce the desired zirconia. This reaction is:

$$ZrSiO_4 + C \rightarrow ZrO_2 + SiO + CO \tag{7}$$

The silicon monoxide diffuses from the first phase into a surrounding second phase consisting of carbon whereupon it reacts with the carbon therein to form silicon carbide fibers as set forth hereinbefore.

In one experimental example, zircon was analyzed for its silica content and mixed with 6.5%, by weight, carbon to form a first phase. This first phase mixture was sandwiched between a second phase of two layers of carbon and heated to about 1485° C for 250 minutes under an argon air flow of 2 liters per minute. The reaction was 98.8% complete and produced zirconia with a slight amount of zircon.

The Effect of Iron upon the Reaction

The inclusion of iron in the surrounding matrix (second phase) of cabon tended to accelerate the reaction between silicon monoxide and carbon to form silicon carbide (Reaction 4). This is demonstrated by Sample 9 in Table I. However, preliminary studies relative to the formation of silicon carbide fibers do not appear to indicate a nucleation and growth type process. With particular reference again to FIG. 2, the iron in the surrounding carbon or second phase appeared as iron-rich globules on the tips of the silicon carbide fibers possibly indicating a vapor-liquid-solid type growth mechanism of the fibers.

The Production of Silicon Carbide Fibers

In those instances where it is desired to produce silicon carbide fibers only, the process of this invention readily adapts to the use of silica as the silicate-bearing material. The silicate-bearing material or silica may be in the form of sand, diatomaceous earth, or the like and is mixed with carbon less than the stoichiometric amount necessary to form silicon carbide (or a slightly greater amount of carbon as set forth hereinbefore) to prepare a first phase. The first phase is dispersed in discrete units such as pellets throughout a second phase consisting of carbon to form a reaction mixture. Heating the reaction mixture to a temperature above about 1200° C and under a nonreactive atmosphere causes the carbon in the first phase to reduce the silica to silicon monoxide. The silicon monoxide is in the vapor phase and diffuses from the first phase into the second phase where it reacts with the second phase carbon to form silicon carbide fibers.

Importantly, the two phase composition of the reaction mixture is believed to be responsible for the formation of the silicon carbide fibers. Otherwise, one would merely produce a non-fibrous crystalline mass or crystals of approximately equal dimensions of silicon carbide as in the historically followed process. In the present invention, the carbon in the second phase reacts in the gaseous phase with the incoming silicon monoxide also in the gaseous phase to produce the silicon carbide which, upon deposition, forms fibers.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within this scope.

What is claimed and desired to be secured by U.S. Letters Patent is:

1. A process for treating a silicate-bearing material to remove therefrom at least a portion of the silicon comprising the steps of:
    obtaining a quantity of silicate-bearing material;
    analyzing the silicate-bearing material to determine the silica content of the silicate-bearing material as a basis for calculating the amount of carbon necessary to reduce at least a portion of the silica to silicon monoxide without forming silicon carbide;
    admixing a predetermined first quantity of carbon with the silicate-bearing material to form a first solid phase, the first carbon being present in the first solid phase in an amount sufficient to reduce at least said portion of silica to silicon monoxide, said first carbon being less than a stoichiometric amount to form silicon carbide upon reaction between the first carbon and said portion of the silica in the silicate-bearing material as indicated by the analyzing step;
    dispersing the first solid phase in a second solid phase comprising a second carbon by pelletizing the first solid phase thereby forming a solids reaction mixture;
    heating the solids reaction mixture under a nonreactive atmosphere to a temperature above about 1200° C thereby reducing said portion of the silica to silicon monoxide with the first carbon in the first solid phase;
    diffusing the silicon monoxide as a gaseous phase from the first solid phase into the second solid phase; and
    reacting the gaseous silicon monoxide with the second carbon in the second solid phase to form silicon carbide, the silicon carbide thereby becoming part of the second solid phase.

2. The process defined in claim 1 wherein the admixing step further comprises providing the first quantity of carbon in an amount within the range on the order of about 5.0% to 16.0% carbon by weight percent of the reaction mixture.

3. The process defined in claim 1 wherein the pelletizing step comprises forming pellets having a particle size within the range on the order of about 100 mesh to 1.0 cubic centimeter.

4. The process defined in claim 1 wherein the reacting step further comprises following the reacting step with a separating step comprising mechanically separating the first solid phase from the second solid phase thereby removing the first solid phase from the second solid phase and the silicon carbide therein.

5. The process defined in claim 1 wherein the separating step further comprises a secondary separating step comprising removing the silicon carbide from the carbon in the second solid phase.

6. The process defined in claim 1 wherein the obtaining step further comprises selecting the silicate-bearing material from the group consisting of clay, bauxite, zircon, sand; and diatomaceous earth.

7. The process defined in claim 6 wherein the selecting step further obtaining a silicate-bearing material having at least one of the elements aluminum and zirconium.

8. A process for producing silicon carbide fibers comprising the steps of:
   obtaining a silicate-bearing earthen material selected from the group consisting of clay, bauxite, zircon, sand, and diatomaceous earth;
   analyzing the earthen material to determine the silica content of the silicate-bearing earthen material as a basis for determining the amount of carbon required to reduce at least a portion of the silica to silicon monoxide without forming silicon carbide;
   mixing a predetermined quantity of carbon with the earthen material to form a first solid phase, the predetermined quantity of carbon being determined by the analyzing step and present in amounts less than the stoichiometric amount required to convert the silica to silicon carbide;
   dispersing the first solid phase of carbon earthen material in a second solid phase comprising a carbon matrix by pelletizing the first solid phase to accommodate screening to separate the pellets from the carbon matrix, thereby forming a solids reaction mixture; and
   forming silicon monoxide in the pellets by reacting the silica with the carbon in the pellets under a nonreactive atmosphere and at a temperature above about 1200° C, the silicon monoxide diffusing from the pellets of the first solid phase and reacting with the carbon matrix of the second solid phase to form fibers of silicon carbide in the second solid phase.

9. The process defined in claim 8 wherein the forming step further comprises separating the pellets of the first solid phase from the second solid phase of silicon carbide fibers and carbon matrix and the silicon carbide fibers from the carbon matrix.

10. A process for separating silicon from silicate-bearing alumina mixtures comprising the steps of:
    obtaining a silicate-bearing alumina mixture;
    admixing a first quantity of carbon with the silicate-bearing alumina mixture at a ratio of about 10.0% to 16.0% carbon, by weight;
    forming a first solid phase with the silicate-bearing alumina and first carbon mixture formed as a plurality of pellets;
    interspersing the pellets of the first solid phase in a second solid phase comprising a second quantity of carbon to form a reaction mixture;
    heating the reaction mixture under an inert atmosphere to a temperature above about 1200° C;
    reducing silica of the silicate-bearing material to silicon monoxide, the silicon monoxide diffusing from the first solid phase and reacting with the carbon of the second solid phase to form silicon carbide in the second solid phase; and
    separating the first solid phase from the second solid phase.

11. The process defined in claim 10 wherein the obtaining step further comprises obtaining a silicate-bearing alumina mixture from a natural source including a naturally-occurring carbon source and analyzing the mixture for silica and carbon prior to said admixing step, said admixing step further comprising adjusting the carbon/silica ratio by supplementing the mixture with the required amount of at least one of silica and carbon thereby achieving the preselected silica/carbon ratio.

* * * * *